United States Patent
Leeflang et al.

(10) Patent No.: US 10,018,033 B2
(45) Date of Patent: Jul. 10, 2018

(54) DOWNHOLE DISTRIBUTED SENSOR ARRAYS FOR MEASURING AT LEAST ONE OF PRESSURE AND TEMPERATURE, DOWNHOLE DISTRIBUTED SENSOR ARRAYS INCLUDING AT LEAST ONE WELD JOINT, AND METHODS OF FORMING SENSORS ARRAYS FOR DOWNHOLE USE INCLUDING WELDING

(71) Applicant: Quartzdyne, Inc., Salt Lake City, UT (US)

(72) Inventors: Brian T. Leeflang, Salt Lake City, UT (US); G. Scott Brown, Eagle Mountain, UT (US)

(73) Assignee: Quartzdyne, Inc., Salt Lake City, UT (US)

( * ) Notice: Subject to any disclaimer, the term of this patent is extended or adjusted under 35 U.S.C. 154(b) by 132 days.

(21) Appl. No.: 14/923,756

(22) Filed: Oct. 27, 2015

(65) Prior Publication Data
US 2016/0123135 A1    May 5, 2016

Related U.S. Application Data

(60) Provisional application No. 62/074,502, filed on Nov. 3, 2014.

(51) Int. Cl.
*E21B 47/06* (2012.01)
*B23K 31/02* (2006.01)
*E21B 47/01* (2012.01)
*E21B 17/20* (2006.01)

(52) U.S. Cl.
CPC .............. *E21B 47/06* (2013.01); *B23K 31/02* (2013.01); *E21B 17/206* (2013.01); *E21B 47/011* (2013.01)

(58) Field of Classification Search
CPC ..... B23K 31/02; E21B 17/206; E21B 47/011; E21B 47/06
See application file for complete search history.

(56) References Cited

U.S. PATENT DOCUMENTS

| 3,561,832 A | 2/1971 | Karrer et al. |
| 3,617,780 A | 11/1971 | Benjaminson et al. |
| 4,550,610 A | 11/1985 | EerNisse |

(Continued)

FOREIGN PATENT DOCUMENTS

| CA | 2467313 A1 | 11/2004 |
| CA | 2591619 A1 | 11/2004 |

(Continued)

OTHER PUBLICATIONS

Brown et al., U.S. Appl. No. 62/074,517, to Brown et al., filed Nov. 3, 2014.

(Continued)

*Primary Examiner* — Francis Gray
(74) *Attorney, Agent, or Firm* — TraskBritt

(57) ABSTRACT

A downhole sensor array includes sensor housings, and each sensor housing contains one or more of a pressure sensor and a temperature sensor. Cable segments connect the sensor housings. A weld joint bonds a sensor housing to a jacket of a cable segment, and a conductor of the cable segment and the jacket of the cable segment may be separated by a void proximate the weld joint. Methods relate to forming such sensor arrays.

20 Claims, 4 Drawing Sheets

(56) References Cited

U.S. PATENT DOCUMENTS

| | | | |
|---|---|---|---|
| 4,629,888 A * | 12/1986 | Wolk | E21B 36/003 |
| | | | 250/256 |
| 4,754,646 A | 7/1988 | EerNisse et al. | |
| 5,231,880 A | 8/1993 | Ward et al. | |
| 5,303,773 A | 4/1994 | Czernichow et al. | |
| 5,471,882 A | 12/1995 | Wiggins | |
| 6,009,216 A | 12/1999 | Pruett et al. | |
| 6,131,462 A | 10/2000 | EerNisse et al. | |
| 6,886,638 B2 | 5/2005 | Ahmed et al. | |
| 6,888,972 B2 | 5/2005 | Berg et al. | |
| 6,919,512 B2 * | 7/2005 | Guven | B23K 20/004 |
| | | | 174/84 R |
| 7,216,719 B2 | 5/2007 | Ahmed et al. | |
| 7,340,819 B2 | 3/2008 | Guven et al. | |
| 7,712,524 B2 | 5/2010 | Patel et al. | |
| 7,735,555 B2 | 6/2010 | Patel et al. | |
| 7,775,275 B2 | 8/2010 | Patel | |
| 7,793,718 B2 | 9/2010 | Patel et al. | |
| 7,817,062 B1 | 10/2010 | Li et al. | |
| 7,836,959 B2 | 11/2010 | Howard et al. | |
| 7,890,273 B2 | 2/2011 | Lovell et al. | |
| 7,896,070 B2 | 3/2011 | Lovell | |
| 7,913,773 B2 | 3/2011 | Li et al. | |
| 8,056,619 B2 | 11/2011 | Patel et al. | |
| 8,082,983 B2 | 12/2011 | Patel et al. | |
| 8,082,990 B2 | 12/2011 | Lovell et al. | |
| 8,146,658 B2 | 4/2012 | Howard et al. | |
| 8,195,398 B2 | 6/2012 | Lovell et al. | |
| 8,235,127 B2 | 8/2012 | Patel et al. | |
| 8,312,923 B2 | 11/2012 | Patel et al. | |
| 8,333,117 B2 | 12/2012 | Brown et al. | |
| 8,671,749 B2 | 3/2014 | Zeineddine | |
| 8,757,276 B2 * | 6/2014 | Alff | E21B 17/02 |
| | | | 166/378 |
| 2005/0279442 A1 | 12/2005 | Guven et al. | |
| 2007/0030167 A1 | 2/2007 | Li et al. | |
| 2007/0227727 A1 * | 10/2007 | Patel | E21B 17/028 |
| | | | 166/250.01 |
| 2007/0289779 A1 * | 12/2007 | Howard | E21B 17/028 |
| | | | 175/40 |
| 2009/0151935 A1 | 6/2009 | Lovell et al. | |
| 2009/0173493 A1 | 7/2009 | Hutin et al. | |
| 2010/0116550 A1 | 5/2010 | Hutin et al. | |
| 2010/0200291 A1 | 8/2010 | Patel et al. | |
| 2011/0107834 A1 * | 5/2011 | Howard | E21B 17/028 |
| | | | 73/431 |
| 2011/0191031 A1 | 8/2011 | Harman et al. | |
| 2012/0013482 A1 | 1/2012 | Patel et al. | |
| 2012/0198939 A1 | 8/2012 | Brown et al. | |
| 2012/0306581 A1 | 12/2012 | Godager | |
| 2012/0323494 A1 | 12/2012 | Lovell et al. | |
| 2013/0220029 A1 | 8/2013 | Gardner et al. | |
| 2014/0174714 A1 | 6/2014 | Patel et al. | |
| 2014/0278155 A1 | 9/2014 | EerNisse et al. | |
| 2015/0007650 A1 * | 1/2015 | Rose | E21B 47/06 |
| | | | 73/152.51 |
| 2015/0059483 A1 | 3/2015 | Puccio et al. | |

FOREIGN PATENT DOCUMENTS

| | | |
|---|---|---|
| CA | 2724709 A1 | 11/2004 |
| CA | 2492608 C | 5/2009 |
| EP | 1915504 B1 | 6/2010 |
| GB | 2382474 B | 12/2003 |
| GB | 2412340 A | 9/2005 |
| GB | 2402559 B | 11/2005 |
| WO | 2008060769 A2 | 5/2008 |
| WO | 2010025025 A1 | 3/2010 |
| WO | 2011006083 A1 | 1/2011 |

OTHER PUBLICATIONS

ICTA, International Coiled Tubing Association presents an Introduction to Coiled Tubing History, Applications and Benefits, www.icota.com, (2005), 32 pages.

* cited by examiner

US 10,018,033 B2

DOWNHOLE DISTRIBUTED SENSOR ARRAYS FOR MEASURING AT LEAST ONE OF PRESSURE AND TEMPERATURE, DOWNHOLE DISTRIBUTED SENSOR ARRAYS INCLUDING AT LEAST ONE WELD JOINT, AND METHODS OF FORMING SENSORS ARRAYS FOR DOWNHOLE USE INCLUDING WELDING

CROSS-REFERENCE TO RELATED APPLICATION

This application claims the benefit of U.S. Provisional Patent Application Ser. No. 62/074,502, filed Nov. 3, 2014, the disclosure of which is hereby incorporated herein in its entirety by this reference.

TECHNICAL FIELD

Embodiments of the present disclosure relate to sensors for measurement of at least one of a pressure and temperature in a subterranean wellbore and, more particularly, to distributed arrays of such sensors, related assemblies, and associated methods.

BACKGROUND

In some applications, e.g., oil and gas production, it may be desirable to collect data from along a particular interval (e.g., length, depth) of a wellbore to obtain information regarding pressure and/or temperature gradients within the wellbore by employing a number of sensors to measure pressure and/or temperature sensors distributed in an array extending substantially along the wellbore interval. When implemented in a downhole environment, the sensors and/or housings may be exposed to pressures up to about 30,000 psi (about 206.84 MPa) and temperatures of up to 200° C. Accordingly, housings of such sensors must be sufficiently robust to withstand such pressures and temperatures when in use.

In many conventional temperature sensor arrays, optical fibers are used as temperature sensors of the sensor array. In such a temperature sensing approach, optical fibers are implemented as linear sensors where temperature affects the light transmission in the optical fibers to create a continuous temperature profile of the downhole environment. However, optical fibers may fail to correctly transmit data if the fibers are bent (e.g., kinked) to a radius of curvature smaller than a certain fixed value, such value depending upon the fiber characteristics. Furthermore, optical fibers may be relatively fragile and prone to failure under conditions where the fibers are subject to shock and vibration. Moreover, as the housings of such sensor arrays must withstand the extreme downhole conditions described above, particularly extreme pressures for prolonged time periods, methods of bonding individual constituent components of the sensor array must provide a sufficiently robust connection between the components to isolate and protect the fragile optical fibers. However, implementation of component bonding methods such as welding, which may provide a robust connection between components, may expose sensitive components of the sensor array to excessive, and potentially damaging, heat required by the welding process.

BRIEF SUMMARY

In some embodiments, a downhole distributed sensor array includes sensor housings, each sensor housing containing one or more of a pressure sensor and a temperature sensor. Cable segments connect the sensor housings. A weld joint bonds a sensor housing of the sensor housings to a jacket of a cable segment of the cable segments. A conductor of the cable segment and the jacket of the cable segment is separated by a void proximate the weld joint.

In additional embodiments, a downhole distributed sensor array includes sensor housings containing one or more of a pressure sensor and a temperature sensor, cable segments, each cable segment connected to at least one sensor housing and comprising an insulation material disposed between a central conductor and an outer jacket, and a weld joint peripherally bonding a longitudinal end portion of the at least one sensor housing to the outer jacket of a cable segment of the cable segments. The weld joint is disposed around the outer jacket of the cable segment proximate a portion of the cable segment having no insulation material between the central conductor and the outer jacket.

In yet additional embodiments, a downhole sensor array includes sensor housings, each sensor housing containing one or more of a pressure sensor and a temperature sensor, and cable segments, each cable segment connected to at least one sensor housing. Each cable segment comprises an insulation material disposed between a central conductor and an outer jacket. A portion of the outer jacket of each cable segment is received within a sleeve of at least one sensor housing.

In yet additional embodiments, the present disclosure includes a method of forming a sensor array for downhole use. The method includes removing a portion of an insulation material from between a conductor of a cable segment and a jacket of the cable segment proximate an end portion of the cable segment to create a void between the conductor and a surrounding portion of the jacket, inserting the end portion of the cable segment comprising the void into a sleeve of a sensor housing, and welding the jacket of the cable segment to the sleeve of the sensor housing at a location on the jacket exterior to the void between the conductor and the jacket.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure provided with reference to the accompanying drawings, in which:

DETAILED DESCRIPTION

In the following detailed description, reference is made to the accompanying drawings that depict, by way of illustration, specific embodiments in which the disclosure may be practiced. However, other embodiments may be utilized, and structural, logical, and configurational changes may be made without departing from the scope of the disclosure. The illustrations presented herein are not meant to be actual views of any particular sensor, sensor array, or component thereof, but are merely idealized representations that are employed to describe embodiments of the present disclosure. The drawings presented herein are not necessarily drawn to scale. Additionally, elements common between drawings may retain the same numerical designation.

Figure 1:
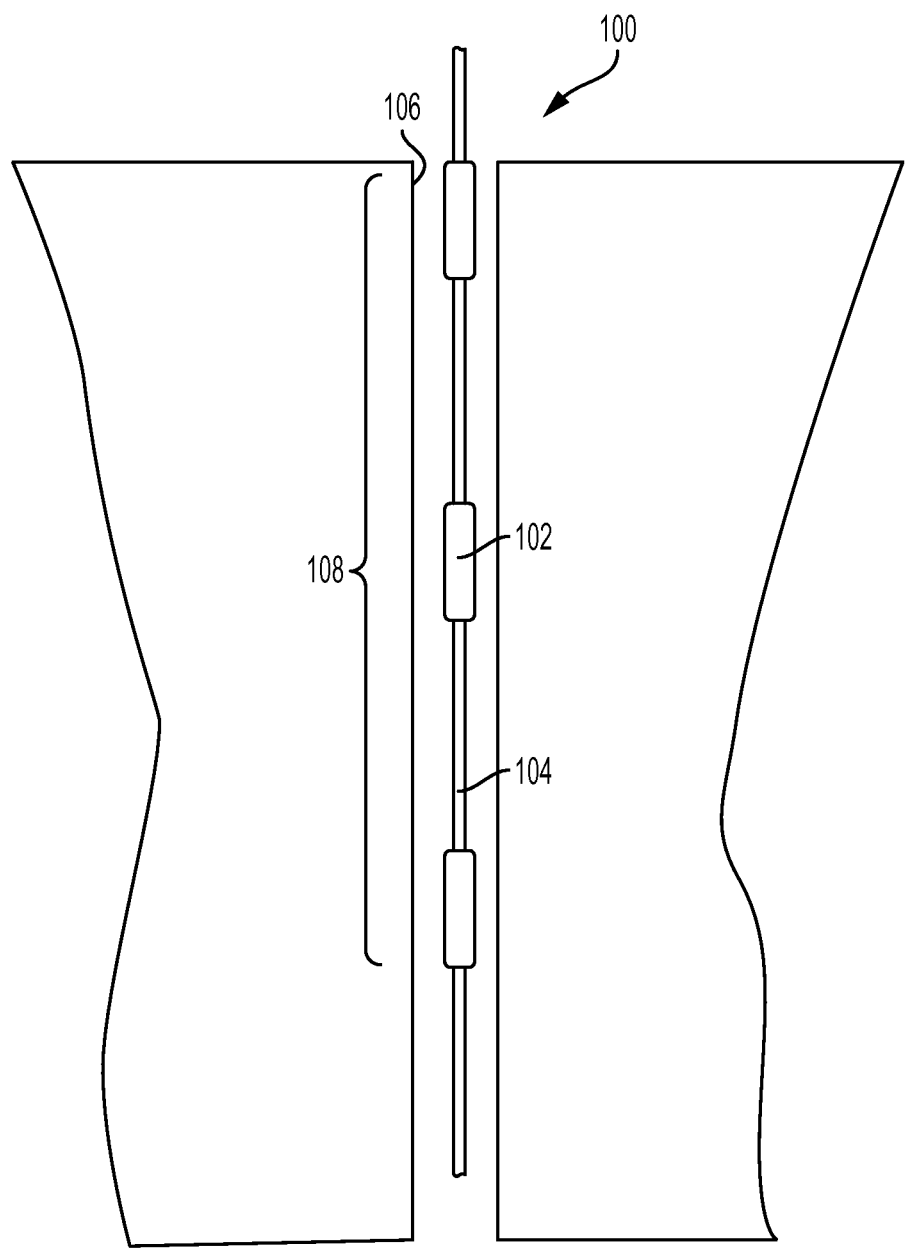
FIG. 1 is an elevation view of a sensor array in accordance with an embodiment of the present disclosure deployed in a wellbore.

Referring now to FIG. 1, a sensor array 100 according to the disclosure includes sensors 102 interconnected by lengths of cable 104. The sensor array 100 may include any suitable number of sensors 102. For example, in some embodiments of the disclosure, the sensor array 100 may include between ten and one hundred sensors 102. The sensors 102 may each be configured to detect at least one of a pressure and a temperature. For example, some or all of the sensors 102 in the sensor array 102 (e.g., a distributed sensor array) may each be configured to at least substantially simultaneously (e.g., at substantially the same time, in the same time interval) detect at least one of a pressure and a temperature in a wellbore and relay those sensed values such that a continuous profile of conditions in the wellbore relating to such sensed values may be provided to an operator monitoring wellbore conditions.

The sensor array 100 may be deployed within a wellbore 106, e.g., a well for the production of oil and/or natural gas. Each sensor 102 of the sensor array 100 may be used to collect data related to at least one of a pressure and a temperature at a particular location within the wellbore 106. For example, the each sensor 102 of the sensor array 100 may collect data relating to conditions within a string of tubular components (e.g., a production string) positioned in the wellbore 106, data relating to conditions in an annulus between the string in the wellbore 106 and the wellbore 106 itself, or combinations thereof. For example, the sensor array 100 may be positioned outside of the production string in the wellbore annulus between the string and a casing or liner string adjacent the wall of the wellbore. In some embodiments, the sensor array 100 may be placed in direct communication with an interior of the production string in the wellbore. For example, the sensor array 100 may be coupled to the outside of the production string and one or more apertures in the production string may place the sensor array 100 in communication with the interior of the production string (e.g., in direct communication with pressure and/or temperature inside the production string via the apertures). Data from each individual sensor 102 may be combined to provide information about a pressure and/or temperature profile within the wellbore 106 along a length 108 of the wellbore 106 along which the sensor array 100 is deployed.

Figure 2:
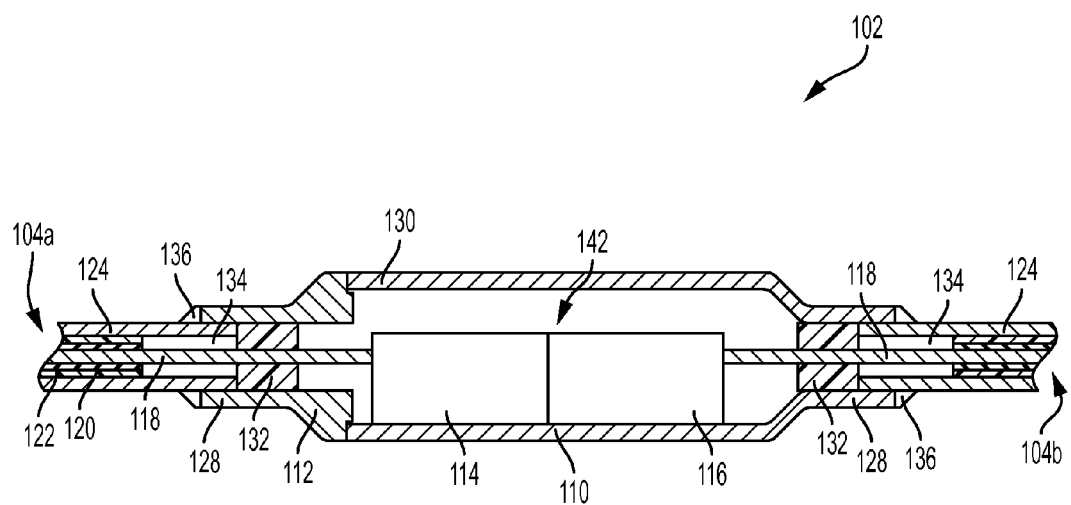
FIG. 2 is a cross-sectional view of a sensor of the sensor array of FIG. 1.

Referring now to FIG. 2, a sensor 102 of the sensor array 100 (FIG. 1) may include one or more sensing elements 114 and one or more electronic components 116 configured to distribute power to, receive data from, and otherwise control the function of the one or more sensing elements 114. The one or more sensing elements 114 and the electronic components 116 may be operatively connected to central electrical conductors 118 within a first cable segment 104a and a second cable segment 104b.

In some embodiments, the one or more sensing elements 114 may include, e.g., one or more resonator sensors, such as, for example, resonator sensors implementing one or more thickness shear mode quartz crystal resonators. As a non-limiting example, suitable quartz resonator sensors may include sensors similar or identical to those described in U.S. patent application Ser. No. 14/472,218, filed Aug. 8, 2014, the disclosure of which is herein incorporated in its entirety by this reference, which application describes the use of quartz crystal sensing elements to sense at least one of a pressure and a temperature. In additional embodiments, the one or more sensing elements 114 may include micro-electro-mechanical devices (MEM devices) or other types of suitable electronic sensors.

The conductor 118 of the cable segments 104a, 104b may be surrounded by insulation 120, an encapsulation layer 122, and a jacket 124. The jacket 124 may be formed of a relatively high-strength material (e.g., metal) as compared to the insulation 120 and encapsulation layer 122. The insulation 120 may comprise a high-dielectric polymer material, examples of which may include polytetrafluoroethylene (PTFE) or fluorinated ethylene propylene (FEP). The encapsulation layer 122 may comprise another polymer material, such as polypropylene. The metal jacket 124 may comprise a metal alloy. For example, the metal jacket 124 may comprise 316L stainless steel.

In some embodiments, the conductor 118 may be a single conductor within and extending through the cable segments 104a, 104b. The conductor 118 may serve to transmit power to drive the one or more sensing elements 114 from a power source located on a rig floor of a drilling rig at the surface of the wellbore 106 (FIG. 1) and may also serve to transmit data signals from the one or more sensing elements 114 in each sensor 102 to monitoring equipment located on the rig floor at the surface of the wellbore 106, or remotely. For example, the sensing elements 114 may be connected through the conductors 118 of the cable segments 104a, 104b, by a multiplexing arrangement controlled by the monitoring equipment (not shown) at the surface of the wellbore 106 and/or by the electronic components 116. In other embodiments, the cable segments 104a, 104b may include multiple conductors 118.

In some embodiments, the one or more electronic components 116 may further be configured to include a bypass mode triggered in the event that a portion of the sensor 102 may be become damaged or malfunction. For example, an associated one or more sensing elements 114 of the sensor 102 may malfunction or become damaged. The one or more electronic components 116 may be configured to recognize failure of the one or more sensing elements 114 or other portion of the sensor 102 and enter the bypass mode so that the sensor 102 does not inhibit or corrupt data flow from and between remaining functional sensors to the surface of the drilling operation.

The one or more sensing elements 114 and the one or more electronic components 116 may be disposed within a housing including one or more housing portions. For example, a housing of the sensor 102 may include multiple portions to enable installation of the sensing elements 114 and the electronic components 116 within the housing. For example, the housing of the sensor 102 may include a housing body 110 and a separate housing end cap 112. The housing body 110 may include one or more features configured to accept a portion of the second cable segment 104b. For example, a sleeve 128 may have an inside diameter substantially similar (e.g., equal to, slightly larger or smaller than) to an outside diameter of the metal jacket 124 of the cable segments 104a, 104b and smaller than an inside diameter of the housing body 110 in order to receive a portion of the metal jacket 124 of the cable segment 104b in the sleeve 128. The housing body 110 may also include a second, open end 130 configured to interface with a portion of the housing end cap 112. The housing end cap 112 may also include a sleeve 128 having an inside diameter substantially similar to the outside diameter of the metal jacket 124 of the cable segment 104a in order to receive a portion of the metal jacket 124 of the cable segment 104a in the housing end cap 112.

The conductors 118 of the cable segments 104a, 104b may be supported and centralized within the housing body 110 by support spacers 132 disposed within the sleeves 128 of the main housing body 110 and the housing end cap 112 proximate end portions of the cable segments 104a, 104b. The support spacers 132 may comprise an electrically insulating material, such as a polymer material (e.g., polypropylene, polytetrafluoroethylene (PTFE), polyethylene terephthalate (PET), polyether ether ketone (PEEK), etc.). The support spacers 132 may abut an end of the metal jacket 124 of the cable segments 104a, 104b, and may be of an outer diameter substantially the same as an inner diameter of sleeves 128, or slightly larger than the inner diameter when in an uncompressed state.

At least a portion of the cable segments 104a, 104b may be at least partially (e.g., entirely) free of one or both of the insulation 120 and encapsulation material 122. For example, one or both of the insulation 120 and encapsulation material 122 may be removed from between the metal jacket 124 and the conductor 118 proximate ends of the cable segments 104a, 104b disposed within sleeves 128 of the housing body 110 and housing end cap 112. In other words, a void 134, such as a substantially annular void, may exist between the conductor 118 and the metal jacket 124 near (e.g., proximate, at) the sleeves 128 of the housing body 110 and housing end cap 112 when the cable segments 104a, 104b are disposed within the housing body 110 and housing end cap 112. For example, the conductors 118 of the cable segments 104a, 104b are exposed proximate a union between the cable segments 104a, 104b and the end cap 112 and housing 110, respectively.

The sensors 102 and cable segments 104a, 104b are joined to form the sensor array 100 (FIG. 1). For example, the sensors 102 may be connected to the cable segments 104a, 104b by bonding (e.g., welding) the sleeves 128 of the housing body 110 and the housing end cap 112 to the metal jacket 124 of the cable segments 104a, 104b. For example, the sleeves 128 and the metal jacket 124 may be welded together at a circumferentially extending weld bead 136, which may also characterized herein as a "weld joint." The weld bead or joint 136 may be located on the jacket 124 proximate the portion of the cable segments 104a, 104b from which the insulation 120 and encapsulation material 122 have been removed.

Because the sensor array 100 (FIG. 1) may be subjected to high pressures and/or temperatures in the downhole environment, the connection (e.g., weld bead 136) between the sensors 102 and the cable segments 104a, 104b may be required to be robust enough to withstand the downhole conditions without permitting contamination of or damage to the one or more sensor elements 114 and electronic components 116. However, high temperatures associated with metal welding processes may damage the insulation 120 and encapsulation material 122. For example, the insulation 120 and encapsulation material 122 may melt, char, or otherwise degrade when exposed to the high heat inherent to a metal welding process. Furthermore, degradation of the insulation 120 and encapsulation material 122 may release vapors that could potentially contaminate and compromise the weld bead 136. Thus, removal of the insulation 120 and encapsulation material 122 from the cable 104 creating voids 134 near the weld bead 136 may prevent contamination of the weld bead 136 or damage to the conductor 118, as well as to insulation material 120 and encapsulation material 122 adjacent the weld bead 136.

Figure 3:
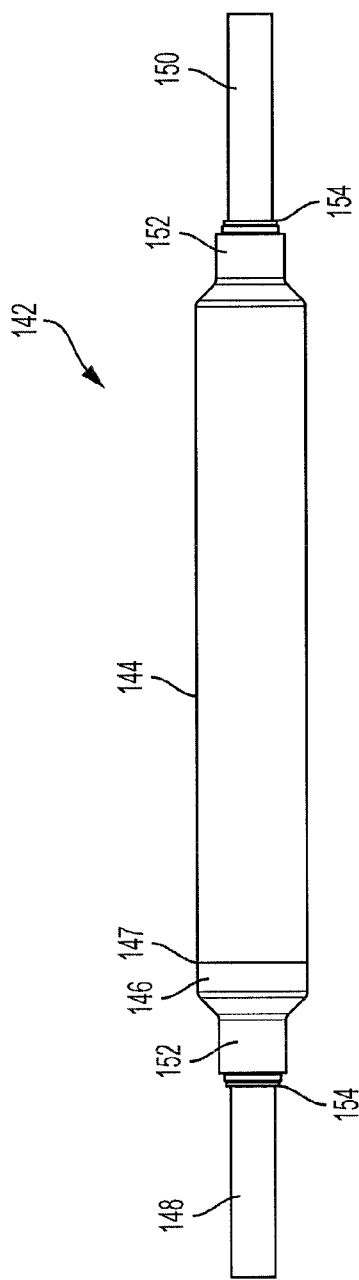
FIG. 3 is a plan view of a sensor in accordance with another embodiment of the present disclosure.

Referring now to FIG. 3, another embodiment of a sensor 142 (e.g., a temperature sensor) for use in a sensor array 100 (FIG. 1) is shown. As shown in FIG. 3, the sensor 142 includes a housing body 144, a housing end cap 146, a first cable segment 148, and a second cable segment 150. The housing body 144 and the housing end cap 146 may be bonded to one another circumferentially at a joint 147. For example, the housing body 144 and the housing end cap 146 may be bonded together at joint 147 by a welding process, e.g., an electron-beam welding process. An electron-beam welding process may enable the housing body 144 and the housing end cap 146 to be welded to one another without exposing the internal components of the sensor 142 and cable segments 148, 150 to excessive heat. Other suitable welding processes may include gas tungsten arc welding (i.e., TIG welding), gas metal arc welding, (i.e., MIG welding), flux-shielded arc welding, oxygen-acetylene torch welding, laser beam welding, etc. The housing body 144 and the housing end cap 146 each include a sleeve 152 into which the first cable segment 148 and the second cable segment 150 may be inserted. The first cable segment 148 and the second cable segment 150 may be bonded to the sleeves 152 as described above. For example, the first cable segment 148 and the second cable segment 150 may be bonded (e.g., sealed) to the sleeves 152 at weld beads 154. The weld beads 154 may be formed by, e.g., TIG welding or other welding processes. The first and second cable segments 148, 150 may connect the sensor 142 with other sensors to form an array of sensors (see, e.g., sensor array 100 (FIG. 1)).

Figure 4:
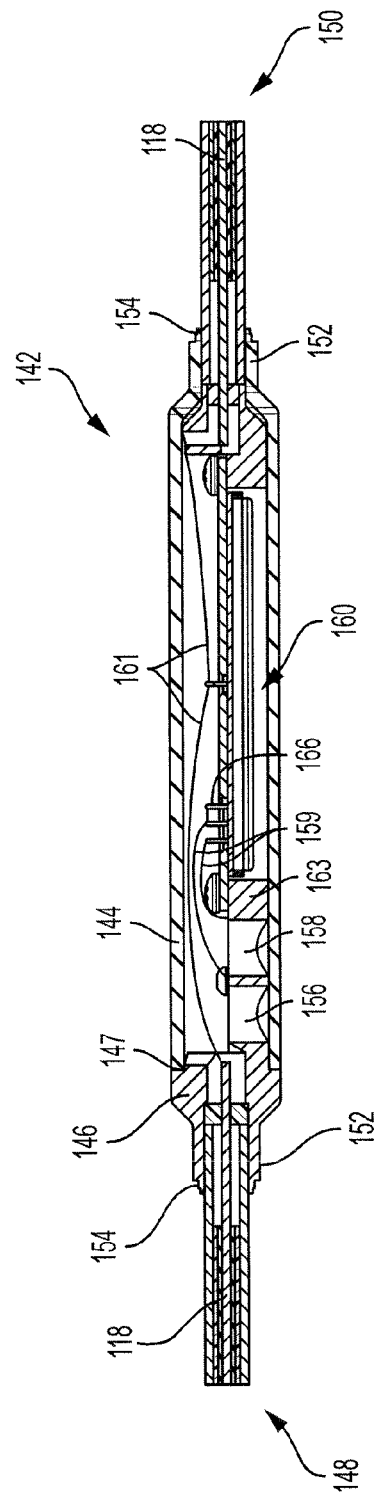
FIG. 4 is a cross-sectional elevation view of the sensor of FIG. 3.

FIG. 4 shows a cross-sectional view of the embodiment of the sensor 142 shown in FIG. 3. As described above, the sensor 142 includes a housing body 144, a housing end cap 146, and first and second cable segments 148, 150 disposed partially within and bonded to (e.g., welded to) sleeves 152 of the housing body 144 and housing end cap 146 at weld joints 154. The sensor 142 may include one or more sensing elements connected to one or more electronic components. For example, the sensor 142 may include a quartz resonator sensor including one or more quartz crystals.

As shown in the embodiment of FIG. 4, the sensor 142 may include a reference quartz crystal resonator 156 and a quartz crystal resonator sensing element 158 configured to measure an ambient temperature environment within the wellbore 106 (FIG. 1) by at least partially exposing quartz crystal resonator sensing element 158 to the ambient temperature environment (e.g., by thermal transmission through the housing body 144, through a working fluid, etc.). The reference quartz crystal resonator 156 and the quartz crystal resonator sensing element 158 may be operatively connected to an electronics assembly 160. For example, the reference quartz crystal resonator 156 and the quartz crystal resonator sensing element 158 may be connected to the electronics assembly 160 by electrical interconnects 159. Additional interconnects 161 may operatively connect conductors 118 of the first and second cable segments 148, 150 to the electronics assembly 160. The electronics assembly 160 may include a high-frequency power source configured to drive the reference quartz crystal resonator 156. The electronics assembly 160 may also drive the quartz crystal resonator sensing element 158 with a high-frequency power source. Temperature-induced frequency changes in the quartz crystal resonator sensing element 158 may be detected by monitoring variations in frequency of the quartz crystal resonator sensing element 158 with respect to a frequency of the reference quartz crystal resonator 156. Data relating to frequency differences between the quartz crystal resonator sensing element 158 and the reference quartz crystal resonator 156 may be manipulated by the electronics assembly 160 or by electrical equipment at the surface of the wellbore 106 (FIG. 1) to provide temperature data to an operator.

In some embodiments, the housing end cap 146 may include an electronics support structure 163 coupled to and extending form the housing end cap 146. The electronics support structure 163 may be configured to accept at least a portion of the reference quartz crystal resonator 156, at least a portion of the quartz crystal resonator sensing element 158, and/or at least a portion of the electronics assembly 160 to facilitate assembly of the sensor 142 by enabling a first portion of the sensor 142 (e.g., the housing end cap 146 and the electronics support structure 163) to be inserted into another portion of the sensor 142 (e.g., the remainder of the housing body 144), as described in further detail below.

Figure 5:
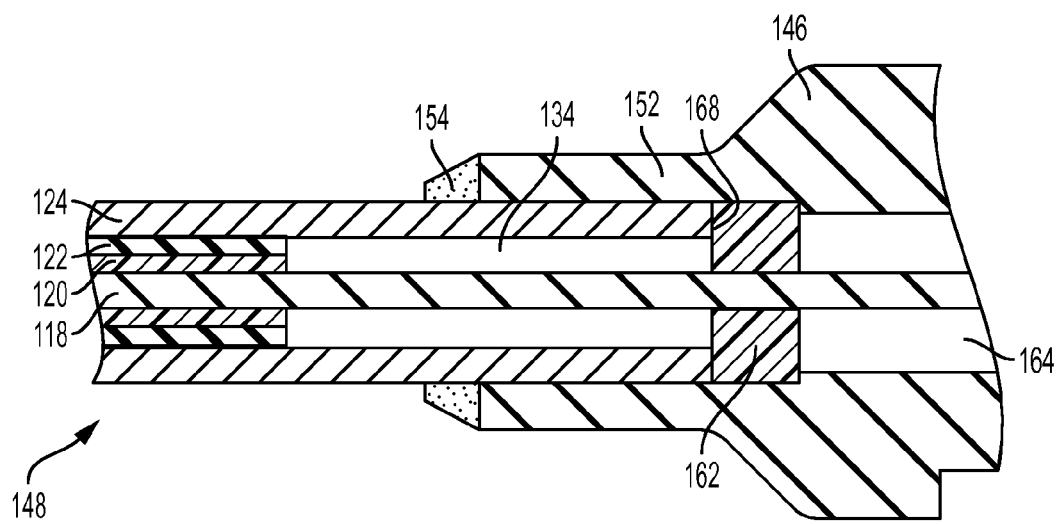
FIG. 5 is an enlarged cross-sectional view of a housing end cap and cable segment of the sensor of FIG. 4.

Referring now to FIG. 5, an enlarged view of the housing end cap 146, the first cable segment 148, and a weld bead 154 of FIG. 4 is shown. A central conductor 118 of the first cable segment 148 is supported by a support spacer 162 disposed within the sleeve 152 of the housing end cap 146. The support spacer 162 may comprise an electrically insulating material and electrically insulate the central conductor 118 from the housing end cap 146.

The first cable segment 148 may include insulation 120 and an encapsulation material 122. As described above, the insulation 120 and the encapsulation material 122 may be removed from between the central conductor 118 and a metal jacket 124 of the first cable segment 148 near (e.g., proximate, at) the location of the weld bead 154, leaving a substantially annular void 134 between the central conductor 118 and the metal jacket 124. Removing the insulation 120 and encapsulation material 122 to leave the void 134 may prevent contamination of the weld bead 154, degradation of the insulation 120 and encapsulation material 122, and damage to the sensor components (e.g., the reference quartz crystal resonator 156, the quartz crystal sensing element 158, and the electronics assembly 160 (FIG. 4)) resulting from degradation of the insulation 120 and encapsulation material 122 during the welding process. Further, the void about the conductor 118 may act to at least partially isolate the conductor 118 from the heat of the welding process. In some embodiments, the support spacer 162 may protect the above-listed sensor components by impeding (e.g., slowing) heat transfer between the volume of void 134 and an interior 164 of the housing 144 (FIG. 4) within which the reference quartz crystal resonator 156, the quartz crystal sensing element 158, and the electronics assembly 160 are disposed.

Referring now to both FIGS. 4 and 5, a sensor 142 may be assembled with first and second cable segments 148, 150 in the following manner. Sensor components and electronic components, e.g., the reference quartz crystal resonator 156, the quartz crystal sensing element 158, and the electronics assembly 160, may be assembled with the electronics support structure 163 of the housing end cap 146. The electrical interconnects 159 may be connected between the reference quartz crystal resonator 156, the quartz crystal sensing element 158, and the electronics assembly 160 by, e.g., soldering the electrical interconnects 159 to terminals 166.

As discussed above, the insulation 120 and encapsulation layer 122 may be removed from ends of the first and second cable segments 148, 150. In some embodiments, the insulation 120 and encapsulation layer 122 may be removed by machining, for example, with a hollow end mill (not shown) having a central opening configured to fit over the conductor 118 and an outer diameter sized to fit within the inside of the metal jacket 124. The cable segments 148, 150 may be mounted in a tooling device (e.g., a jig or vise) of a milling machine and the hollow end mill may be used to remove a portion of the insulation 120 and the encapsulation material 122 from between the conductor 118 and the metal jacket 124 to create a substantially annular void 134. In some embodiments, the insulation 120 and encapsulation material 122 may alternatively or additionally be removed by exposing the insulation 120 and encapsulation material 122 to a solvent. As non-limiting examples, the insulation 120 and encapsulation material 122 may be removed from within about 1 inch (25.4 mm) of an end 168 of the metal jacket 124 or from within about 2 inches (50.8 mm) of the end 168 of the metal jacket 124. In other embodiments, the insulation 120 and encapsulation layer 122 may be removed from within less than one inch or more than two inches from the end 168 of the metal jacket 124.

The first cable segment 148 may be inserted within the sleeve 152 of the housing end cap 146. The support spacer 162 may be disposed within the sleeve 152 of the housing end cap 146 and serve to centralize the conductor 118 within the housing end cap 146 and electrically insulate the conductor 118 from the housing end cap 146. In some embodiments, the support spacer 162 may be positioned to abut the end 168 of the metal jacket 124 of the first cable segment 148.

The metal jacket 124 of the first cable segment 148 may be welded to the sleeve 152 of the housing end cap 146 using any of the welding methods described above. Before or after welding the metal jacket 124 of the first cable segment 148 to the sleeve 152 of the housing end cap 146, the conductor 118 may be connected to the electronics assembly 160 by interconnect 161.

The reference quartz crystal resonator 156, the quartz crystal resonator sensing element 158, and the electronics assembly 160 attached to the electronics support structure 163 of the housing end cap 146 may be inserted into the housing body 144 (e.g., with the end cap 146) until the housing end cap 146 mates with the housing body 144 at joint 147. The housing end cap 146 may then be welded to the housing body 144 at joint 147 by any of the welding methods described above, or other methods.

The second cable segment 150 (FIG. 4) may be connected to the electronics assembly 160 and inserted into the sleeve 152 of the housing body 144 with the conductor 118 of second cable segment 150. For example, in one embodiment, an interconnect 161 may be connected to the conductor 118 prior to the second cable segment 150 being inserted into the sleeve 152. In other embodiments, the housing body 144 and/or the electronics assembly 160 may include electrical terminals (not shown) configured to contact the conductor 118 when the second cable segment 150 is inserted into the sleeve 152 of the housing body 144. The metal jacket 124 of the second cable segment 150 may be welded to the sleeve 152 of the housing body 144 by any of the methods described above.

The present disclosure provides a sensor array for downhole use utilizing electrical interconnecting cables between individual sensors of the sensor array. As discussed above, conventional downhole sensor systems feature fiber optic data interconnects between sensor devices. Fiber optical interconnects may have significant disadvantages as compared to the electrical interconnects disclosed herein. For example, optical fibers are sensitive to geometry and alignment and may fail to accurately transmit data if the optical fiber is bent (e.g., kinked) to a radius of curvature smaller than a certain value. Furthermore, optical fibers may be fragile and prone to failure under conditions of shock and vibration frequently encountered in a downhole environment. In contrast, the use of electrical conductors as disclosed herein may provide a robust and reliable connection between sensors of the sensor array as a more robust and/or less expensive and fragile alternative to the use of fiber optics. Moreover, welding the metal jacket of the cable segments to the housing body and the housing end cap may provide a bond and seal between the cable segments and the sensor capable of withstanding the elevated temperatures and extreme pressures to which the sensor array may be subjected during use. Finally, the configuration of the housing body and the housing end cap may enable the welding processes described herein to be performed without damaging sensitive components (e.g., the one or more sensing elements and the one or more electrical components) within the housing and the cable housing connecting the housings.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure encompasses all modifications, variations, combinations, and alternatives falling within the scope of the disclosure as defined by the following appended claims and their legal equivalents.

What is claimed is:

1. A downhole distributed sensor array, comprising:
   sensor housings, each sensor housing containing at least one of a pressure sensor or a temperature sensor, the at least one of the pressure sensor or the temperature sensor comprising a quartz resonator sensor;
   cable segments connecting the sensor housings; and
   a weld joint bonding a sensor housing of the sensor housings to a jacket of a cable segment of the cable segments, a conductor of the cable segment and the jacket of the cable segment being separated by an annular void proximate the weld joint.

2. The distributed sensor array of claim 1, wherein the sensor housing comprises a sleeve at a longitudinal end of the sensor housing, the sleeve having a smaller inside diameter than an inside diameter of a body of the sensor housing of the plurality of sensor housings, and wherein the weld joint is located between the sleeve of the sensor housing and the jacket of the cable segment.

3. The distributed sensor array of claim 1, wherein each cable segment comprises an insulation material disposed between a portion of the conductor and a portion of the jacket of each cable segment, the insulation material extending along a majority of a length of each cable segment between adjacent sensor housings.

4. The distributed sensor array of claim 1, wherein the sensor array further comprises a support spacer disposed within the sensor housing and surrounding a portion of the conductor.

5. The distributed sensor array of claim 4, wherein the support spacer abuts an end of the jacket.

6. The distributed sensor array of claim 1, wherein the void is defined at least partially by the jacket of the cable segment.

7. The distributed sensor array of claim 6, wherein the void extends continuously between an inner surface of the jacket of the cable segment to an outer surface of the conductor.

8. The distributed sensor array of claim 1, wherein the weld joint comprises weld joints bonding each of the sensor housings to a jacket of a respective cable segment extending between two adjacent sensor housings, a conductor of each of the respective cable segment and the jacket of the respective cable segment being separated by a void positioned radially interior of the weld joint.

9. A downhole distributed sensor array, comprising:
   sensor housings, each sensor housing containing at least one of a pressure sensor or a temperature sensor;
   cable segments connecting the sensor housings; and
   a weld joint bonding a sensor housing of the sensor housings to a jacket of a cable segment of the cable segments, a conductor of the cable segment and the jacket of the cable segment being separated by an annular void proximate the weld joint, wherein the weld joint is positioned at an overlap between the jacket of the cable segment and the sensor housing, the jacket of the cable segment being positioned radially interior of the weld joint and a portion of the sensor housing, and the void being positioned radially interior of the weld joint, the portion of the sensor housing, and a portion of the jacket of the cable segment.

10. The distributed sensor array of claim 9, wherein the sensor array further comprises a support spacer disposed within the sensor housing, surrounding a portion of the conductor, and positioned adjacent to the overlap between the jacket of the cable segment and the sensor housing.

11. The distributed sensor array of claim 1, wherein the cable segment lacks insulation material between the conductor and the outer jacket at the weld joint.

12. A downhole distributed sensor array, comprising:
   sensor housings containing at least one of a pressure sensor or a temperature sensor;
   cable segments, each cable segment connected to at least one sensor housing and comprising an insulation material disposed between a central conductor and an outer jacket; and
   a weld joint peripherally bonding a longitudinal end portion of the at least one sensor housing to the outer jacket of a cable segment of the cable segments, wherein the weld joint is disposed around the outer jacket of the cable segment proximate a portion of the cable segment having no insulation material in a volume within the cable segment extending between the central conductor to and the outer jacket.

13. The distributed sensor array of claim 12, wherein the portion of the cable segment having no insulation material between the central conductor and the outer jacket comprises a void defined between the outer jacket of the cable segment and the central conductor.

14. A downhole sensor array, comprising:
   sensor housings, each sensor housing containing at least one of a pressure sensor or a temperature sensor; and
   cable segments, each cable segment connected to at least one sensor housing, each cable segment comprising an insulation material disposed between a central conductor and an outer jacket, wherein a portion of the outer jacket of each cable segment is received inside a sleeve of at least one sensor housing.

15. The sensor array of claim 14, wherein the outer jacket of each cable segment is welded to a sleeve of the at least one sensor housing.

16. A method of forming a sensor array for downhole use, the method comprising:
   removing a portion of an insulation material from between a conductor of a cable segment and a jacket of the cable segment proximate an end portion of the cable segment to create an annular void extending around at least a majority of the conductor and positioned between the conductor and a surrounding portion of the jacket;
   inserting the end portion of the cable segment comprising the void into a sleeve of a sensor housing; and
   welding the jacket of the cable segment to the sleeve of the sensor housing at a location on the jacket exterior to the void between the conductor and the jacket while substantially maintaining the void.

17. The method of claim 16, further comprising removing an encapsulating material from between the conductor of the cable segment and the jacket of the cable segment.

18. The method of claim 16, wherein removing a portion of an insulation material from between the conductor of the cable segment and the jacket of the cable segment comprises milling the insulation material with a hollow end mill.

19. The method of claim 16, further comprising placing a support spacer around the conductor of the cable segment proximate the end portion and abutting the jacket with the support spacer prior to inserting the end portion of the cable segment into the sleeve of the sensor housing.

20. The sensor array of claim 14, wherein the outer jacket of each cable segment comprises an outermost portion of the respective cable segment.

* * * * *

UNITED STATES PATENT AND TRADEMARK OFFICE
CERTIFICATE OF CORRECTION

PATENT NO. : 10,018,033 B2
APPLICATION NO. : 14/923756
DATED : July 10, 2018
INVENTOR(S) : Brian T. Leeflang and G. Scott Brown Page 1 of 1

It is certified that error appears in the above-identified patent and that said Letters Patent is hereby corrected as shown below:

On the Title Page

In ITEM (54): change "DOWNHOLE DISTRIBUTED SENSOR ARRAYS FOR MEASURING AT LEAST ONE OF PRESSURE AND TEMPERATURE, DOWNHOLE DISTRIBUTED SENSOR ARRAYS INCLUDING AT LEAST ONE WELD JOINT, AND METHODS OF FORMING SENSORS ARRAYS FOR DOWNHOLE USE INCLUDING WELDING" to --DOWNHOLE DISTRIBUTED SENSOR ARRAYS FOR MEASURING AT LEAST ONE OF PRESSURE AND TEMPERATURE, DOWNHOLE DISTRIBUTED SENSOR ARRAYS INCLUDING AT LEAST ONE WELD JOINT, AND METHODS OF FORMING SENSOR ARRAYS FOR DOWNHOLE USE INCLUDING WELDING--

In the Claims

Claim 12, Column 10, Line 50, change "conductor to and the" to --conductor and the--

Signed and Sealed this
Twenty-eighth Day of August, 2018

Andrei Iancu
*Director of the United States Patent and Trademark Office*